(12) United States Patent
Nakamura et al.

(10) Patent No.: US 6,776,191 B2
(45) Date of Patent: Aug. 17, 2004

(54) SPOOL VALVE DEVICE

(75) Inventors: Norihiro Nakamura, Kariya (JP); Yasuo Konishi, Toyoake (JP); Hitoshi Ikeuchi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 58 days.

(21) Appl. No.: 10/124,299

(22) Filed: Apr. 18, 2002

(65) Prior Publication Data

US 2003/0024581 A1 Feb. 6, 2003

(30) Foreign Application Priority Data

Apr. 18, 2001 (JP) ........................................ 2001-120080

(51) Int. Cl.[7] ................................................ F15B 13/04
(52) U.S. Cl. ................................ 137/625.69; 251/121
(58) Field of Search ...................... 137/625.69; 251/121

(56) References Cited

U.S. PATENT DOCUMENTS 4,220,178 A * 9/1980 Jackson .................. 137/625.69
4,651,776 A * 3/1987 Nakano et al. ......... 137/625.69
4,899,842 A * 2/1990 Emori et al. ............ 137/625.69
4,941,508 A * 7/1990 Hennessy et al. ....... 137/625.69

FOREIGN PATENT DOCUMENTS

JP          11-34852 A       2/1999
JP       P2001-138894 A  *   5/2001  ............. F16K/3/26

* cited by examiner

Primary Examiner—Gerald A. Michalsky
(74) Attorney, Agent, or Firm—Burns, Doane, Swecker & Mathis, L.L.P.

(57) ABSTRACT

A spool valve includes a sleeve and a spool. The sleeve has a first communicating hole opening into the cylinder bore and a second communicating hole opening into the cylinder bore and separated from the first communicating hole in the axial direction of the cylinder bore. The spool is fluidtightly accommodated in the cylinder bore to slide and has one end portion which opens and closes the first communicating hole upon sliding operation thereof and the another end portion which opens and closes the second communicating hole upon sliding operation thereof. At least one of the end portions has an end surface extending from the outer circumference approximately at a right angle to the spool axis and an inclined surface which progressively decreases a diameter of the spool from the end surface.

3 Claims, 3 Drawing Sheets

US 6,776,191 B2

SPOOL VALVE DEVICE

FIELD OF THE INVENTION

This invention relates to a spool valve and more particularly relates to a spool valve which is suitable for a hydraulic brake device for a vehicle.

BACKGROUND OF THE INVENTION

With respect to a hydraulic brake device for a vehicle, a variety of devices are known. For example, Japanese Patent Application Laid-Open Publication No. 11-34852 discloses a hydraulic brake device having a regulator which regulates the braking pressure by a spool valve. The hydraulic brake device described in this publication includes an auxiliary hydraulic pressure source for increasing the pressure of the brake fluid to a predetermined pressure and for outputting a power hydraulic pressure, a control piston fluidtightly and slidably accommodated in a cylinder body ahead of a master piston and disposed so as to work with the master piston and a regulator for introducing the power hydraulic pressure outputted from the auxiliary hydraulic pressure source, for driving the spool valve in response to the movement of the control piston and for regulating to a predetermined pressure and the master piston assisted by the outputted hydraulic pressure of the regulator which is applied to a power chamber of a master cylinder.

The spool valve used for the regulator in the above publication generally includes a sleeve (a cylinder) and a spool, and is constituted so that the pressure of the fluid (for example, brake fluid) is regulated by the introduction and/or the discharge of the fluid into the sleeve in response to the movement of the spool. In concrete terms, a cylinder bore, a first communicating hole which is opened into the cylinder bore and a second communicating hole which is opened into the cylinder bore and which is separated from the first communicating hole with a predetermined distance in the axial direction of the cylinder bore are formed on the sleeve and the spool is fluidtightly accommodated in the cylinder bore so as to able to slide and is provided with an one end portion which opens and closes the first communicating hole in response to the sliding operation thereof and the other end portion which opens and closes the second communicating hole is response to the sliding operation thereof.

In order to smooth the introduction of the fluid into the cylinder bore of the sleeve, especially, in order to decrease a flow velocity noise or a hitting sound generated at the introduction of the high pressurized fluid and to prevent the cavitation from generating, in general, an inclined surface which decreases progressively a diameter of the spool outwardly is formed on both ends of the spool. In this case, since the measure of an intermediate portion of the spool extending to the positions where the inclined surfaces start becomes the criterion for determining the open and close of the first and second communicating holes of the sleeve, the strict dimensional accuracy is required for setting the relative location between the spool and the sleeve adequately. Accordingly, it is necessary to process the inclined surface of the both end portions of the spool with a high degree of accuracy. However, for example, since the measure of the intermediate portion of the spool changes when the outer circumferential surface of the spool is grinded, it is murderous to set the measure of the intermediate portion of the spool to a predetermined value. Thereby, it is difficult to produce in large quantities and the cost is increased.

An object of the present invention is to provide a spool valve which can set the relative location between the spool and the sleeve adequately and easily with simple structures and which can ensure the smooth flow of the fluid.

SUMMARY OF THE INVENTION

A spool valve includes a sleeve having a cylinder bore, a first communicating hole which is opened into the cylinder bore and a second communicating hole which is opened into the cylinder bore and which is separated from the first communicating hole with a predetermined distance in the axial direction of the cylinder bore, and a spool fluidtightly accommodated in the cylinder bore so as to able to slide and having an one end portion which opens and closes the first communicating hole in response to the sliding operation thereof and the other end portion which opens and closes the second communicating hole is response to the sliding operation thereof. A step portion having an end surface which is approximately at right angle to the axis of the spool from an outer circumference and an inclined surface which decreases progressively a diameter of the spool from the end surface toward the outside of the spool is formed on at least one of the one end portion and the other end portion of the spool. The communicating condition at an intermediate position between a closed position and a full opened position is included in the above open of the first and second communicating holes.

It is desirable that the inclined surface is constituted by a plurality of inclined surfaces. Also, a boundary between the end surface and the inclined surface may be formed by a consecutive curved surface. Further, it is desirable that the spool has a groove which is formed on the outer circumference and that the inclined surface is consecutively formed until the groove.

BRIEF DESCRIPTION OF THE DRAWING FIGURES

Hereinafter, embodiments of the present invention will be described with reference to the drawing figures in which like elements are designated by like reference numerals.

DETAILED DESCRIPTION OF THE INVENTION

Figure 1:
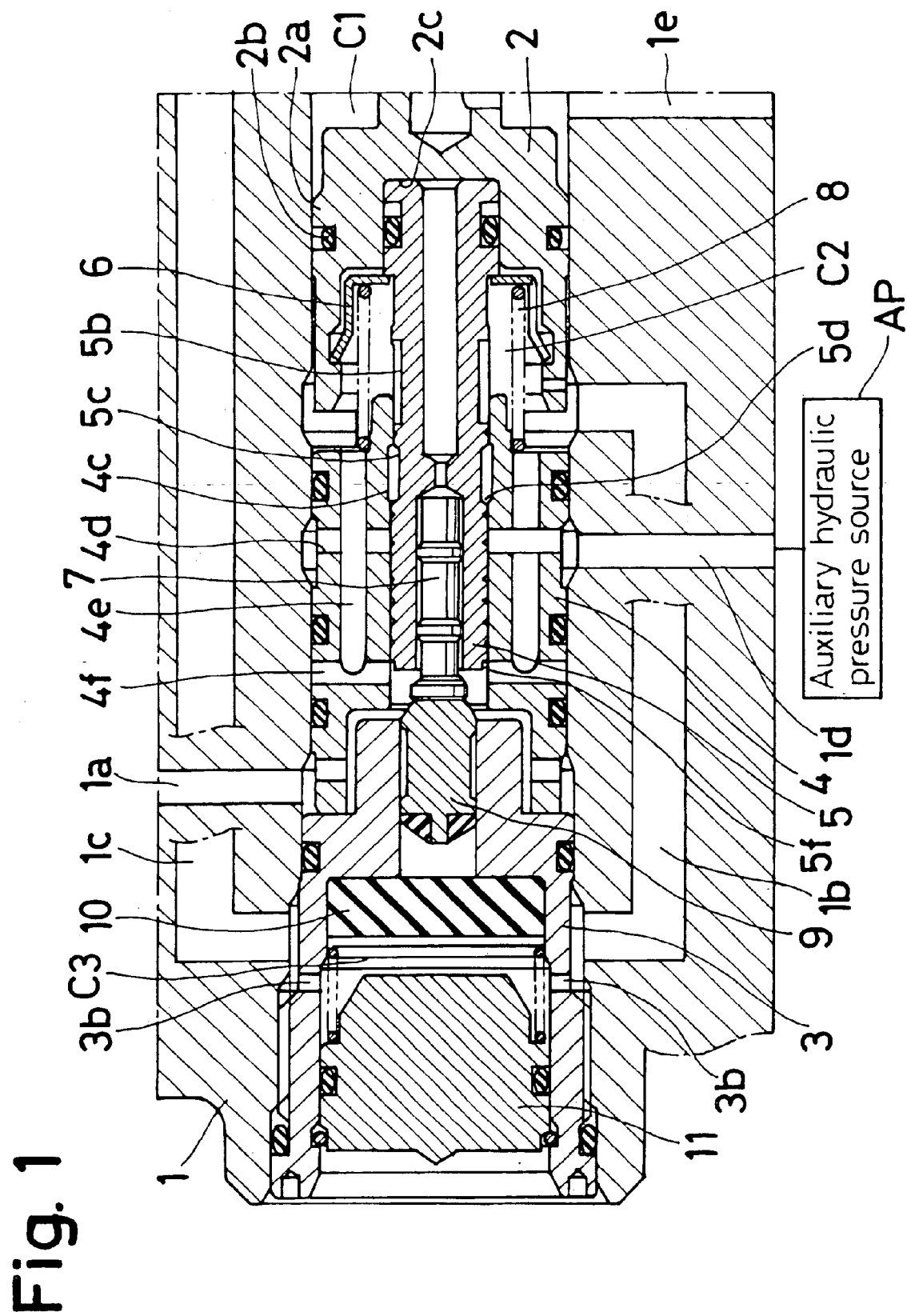
FIG. 1 is a cross-sectional view of a part of a hydraulic brake device which includes a spool valve of one embodiment of the present invention.

FIG. 1 shows a part of a hydraulic brake device utilizing a spool valve according to one embodiment of the present invention. In FIG. 1, a master cylinder part (not shown) and a regulator part (not shown) are provided in a cylinder body 1 having basically the same structure as in the above described Japanese Patent Application Laid-Open Publication No. 11-34852, except for the structure of the spool valve. A cylinder bore is formed in the cylinder body 1, and a master piston (not shown) and a control piston 2 are accommodated in the cylinder bore. A pressure chamber C1 is defined between the master piston and the control piston 2.

The regulator part of this embodiment is formed at a front side of the cylinder body 1. An auxiliary hydraulic pressure source AP is connected to the regulator part and an outputted power hydraulic pressure of the auxiliary hydraulic pressure source AP is controlled accordingly and is outputted. The auxiliary hydraulic pressure source AP includes a hydraulic pump (not shown) which is driven by an electric motor (not shown). An input side of the hydraulic pump is connected to a reservoir (not shown) and an output side of the hydraulic pump is connected to an accumulator (not shown). The power hydraulic pressure is supplied from the accumulator to communicating holes 4d of the spool valve via a hydraulic pressure passage 1d. A land portion 2a is formed on the control piston 2 which is accommodated in the cylinder bore and a circular seal member 2b is mounted on the land portion 2a. Accordingly, the pressure chamber C1 and a regulator chamber C2 are separated from each other by the seal member 2b. Further, a concave portion 2c is formed on the control piston 2 and a rear end portion of a spool 5 is held in the concave portion 2c as described later.

Cylindrical sleeves 3 and 4 are fitted into the cylinder bore of the cylinder body 1 and the regulator chamber C2 which is a chamber for regulating the pressure is formed between the sleeve 4 and the control piston 2. A plurality of circular grooves are formed on the outer circumference of the sleeves 3 and 4 and circular seal members are fitted into the grooves, respectively. Communicating holes 3b which extend in the radial direction are formed in the sleeve 3 between the adjacent seal members, and communicating holes 4d, 4f which extend in the radial direction are formed in the sleeve 4 between the adjacent seal members. The spool 5 is slidably accommodated in a hollow portion of the sleeve 4 and is disposed so that an opening portion of the communicating holes 4f is closed by the forward movement of the spool 5.

In the axial direction of the sleeve 4, communicating holes 4e are formed which each have one end communicating to the communicating holes 4f and another end communicating to the regulator chamber C2. When the communicating holes 4f are opened, the regulator chamber C2 is communicated to a hydraulic pressure passage 1a via the communicating holes 4e, 4f. The communicating holes 4d are communicated to the auxiliary hydraulic pressure source AP via the hydraulic pressure passage 1d. However, in a position shown in FIG. 1, the communicating holes 4d are closed by the outer circumferential surface of the spool 5. Further, a circular groove 4c is formed on the inner circumferential surface of the sleeve 4 behind the communicating holes 4d.

A plunger 7 is fitted at the front end of the spool 5 so as to project in the axial direction. The rear end of the spool 5 is located in the regulator chamber C2 and is engaged with the control piston 2. Namely, a retainer 6 is supported in the concave portion 2c of the control piston 2 and a spring 8 is disposed between the retainer 6 and the sleeve 4, and the spool 5 is urged so as to contact with the control piston 2. At the initial position (the backward position) of the control piston 2, the opening portions of the communicating holes 4f are not closed by the spool 5 and the regulator chamber C2 is communicated to the reservoir (not shown) via the communicating holes 4e, 4f of the sleeve 4 and the hydraulic pressure passage 1a, and the brake fluid under atmosphere is filled.

Further, a circular groove 5b is formed on the outer circumferential surface of the spool 5. The circular groove 5b is formed throughout a predetermined region in the axial direction which centers on the rear end of the sleeve 4 at the backward position of the spool 5. A circular groove 5c is formed on a portion of the outer circumferential surface of the spool 5 which is separated forward from the groove 5b with a predetermined distance and which is opposite to the groove 4c of the sleeve 4. At a position shown in FIG. 1, the regulator chamber C2 is communicated to the reservoir (not shown) via the communicating holes 4e, 4f and the hydraulic pressure passage 1a and is under atmospheric pressure. When the spool 5 moves forward in accordance with the forward movement of the control piston 2, the communicating holes 4f are closed and conversely the communicating holes 4d oppose the groove 5c of the spool 5 and the groove 4c opposes the groove 5b. Accordingly, the regulator chamber C2 communicates to the auxiliary hydraulic pressure source AP. Thereby, the power hydraulic pressure of the auxiliary hydraulic pressure source AP is supplied to the regulator chamber C2 and is increased.

Figure 2:
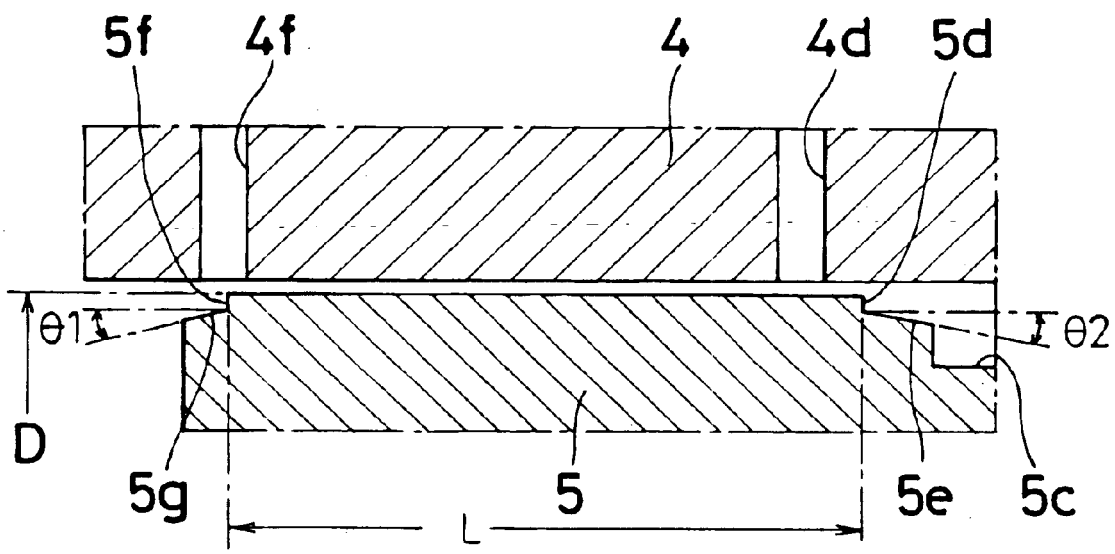
FIG. 2 is a cross-sectional view showing the relationship between the spool and the sleeve of the spool valve of one embodiment of the present invention.

Further, as shown in FIG. 2 on an enlarged scale, the end surfaces 5d, 5f which are approximately at a right angle to the axis (not shown) of the spool 5 from the outer circumference are formed on the rear end portion and the front end portion of the spool 5, respectively. Further, inclined surfaces 5e, 5g having an inclined angle $\theta 1$, $\theta 2$ to progressively decrease the diameter of the spool 5 from the end surfaces 5d, 5f toward the outside end of the spool 5 are formed on the rear end portion and the front end portion of the spool 5, respectively. Thereby, step portions are formed on the rear end portion and the front end portion of the spool 5, respectively. When the communicating holes 4d, 4f are opposite to the outer circumferential surface of an intermediate portion of the spool 5, the communicating holes 4d, 4f are closed. When the communicating holes 4d, 4f are opposite to the end surfaces 5d, 5f of the spool 5, the communicating holes 4d, 4f are opened.

At this time, the measure L of the intermediate portion of the spool 5 extending to the positions where the inclined surfaces 5e, 5g start is set by the end surfaces 5d, 5f. Even if the inclined angles $\theta 1$, $\theta 2$ change or the outer diameter D of the spool 5 changes due to grinding, the measure L of the intermediate portion of the spool 5 is maintained at a constant value without changing. Accordingly, since it is possible to set the relative location between the spool and the sleeve correctly and easily without processing the inclined surfaces 5e, 5g with a high degree of accuracy, it is possible to produce large quantities while the cost is decreased. Further, since the outer circumferential surfaces extending outward from the end surfaces 5d, 5f are formed by the inclined surfaces 5e, 5g, rapid flow velocity change of the brake fluid introduced into the sleeve 4 is absorbed and so it is possible to decrease flow velocity noise.

On the other hand, a hollow portion of the sleeve 3 is formed to have a stepped bore shape. A transmitting member 9 is fitted into a small diameter bore portion of the sleeve 3 so as to able to slide in the axial direction and is disposed so that a rear end thereof is opposite to the top end of the plunger 7. Further, an elastic member 10 such as rubber is fitted into a large diameter bore portion and is disposed so as to contact with the top end of the transmitting member 9. In this embodiment, a contacting member whose shape is the frustum of a circular cone is provided on the top end of the transmitting member 9. However, the top end of the transmitting member 9 may be formed into the shape of a frustum of a circular cone A plug 11 is fitted in the top end of the hollow portion of the sleeve 3. A reaction chamber C3 formed between the plug 1 and the elastic member 10 is communicated to the regulator chamber C2 via a communicating hole 3b (downward in FIG. 1) and a hydraulic pressure passage 1b and to a rear power chamber (not shown) via a communicating hole 3b (upward in FIG. 1) and a hydraulic pressure passage 1c. Further, the pressure chamber is communicated to front wheel cylinders (not shown) via a hydraulic pressure passage 1e, and the power chamber (not shown) is communicated to rear wheel cylinders (not shown).

Next, the operation of the spool valve including the sleeve 4 and spool 5 and the operation of the members associated with the spool valve will be described. FIG. 1 shows a condition in which a brake pedal (not shown) is not operated. When the brake pedal (not shown) is operated and the control piston 2 is moved forwardly, the communicating holes 4f are closed by the spool 5 supported by the control piston 2 and the communication with the reservoir (not shown) is interrupted. Simultaneously, the power hydraulic pressure of the auxiliary hydraulic pressure source AP is introduced from the hydraulic pressure passage 1b into the regulator chamber C2 via the communicating holes 4d, the circular groove 4c, the end surface 5d, the inclined surface 5e, the groove 5c and the groove 5b and is supplied to the reaction chamber C3 via the hydraulic pressure passage 1b as a regulated pressure, and further is supplied to the power chamber (not shown) via the hydraulic pressure passage 1c. Thereby, the master piston (not shown) is assisted and is moved forwardly. Then, the inside of the pressure chamber C1 is further compressed and the master cylinder pressure is outputted from the hydraulic pressure passage 1e to the front wheel cylinders (not shown), and the regulated pressure is supplied to the rear wheel cylinders (not shown). Since the end surface 5d of the step portion is formed approximately at right angle and the power hydraulic pressure flows into the regulator chamber C2 all at once, a good brake feeling is obtained. Since the power hydraulic pressure is guided by the inclined surface 5e after the inflow, a smooth flow is obtained.

When the force applied to the control piston 2 by the regulated pressure in the regulator chamber C2 is larger than the force applied to the control piston 2 by the master cylinder pressure in the pressure chamber C1, the control piston 2 moves rearward and the communicating holes 4f are communicated to the reservoir (not shown), and then the pressure in the regulator chamber C2 is decreased. When the force applied to the control piston 2 by the regulated pressure in the regulator chamber C2 is smaller than the force applied to the control piston 2 by the master cylinder pressure in the pressure chamber C1, the control piston 2 moves forward and the communicating holes 4f are closed. Conversely, the regulator chamber C2 is communicated to the auxiliary hydraulic pressure source AP via the communicating holes 4d and so on and the pressure in the regulator chamber C2 is increased. The pressure in the regulator chamber C2 is controlled by repeated movement of the spool 5 associated with the movement of the control piston 2 so that the force applied to the control piston 2 by the regulated pressure is equalized with the force applied to the control piston 2 by the master cylinder pressure.

As a result, the regulated pressure which is approximately in proportion with the master cylinder pressure is outputted until the force by the regulated pressure in the reaction chamber C3 is transmitted to the plunger 7 via the elastic member 10 and the transmitting member 9. Further, when the regulated pressure is increased and the central portion of the elastic member is transformed rearward by the regulated pressure supplied to the reaction chamber C3, the transmitting member 9 contacts with the plunger 7 and the spool 5 is pressed rearward, and the opening area of the communicating holes 4f increases. Thereby, the regulated pressure in the regulator chamber C2 is decreased and a brake pressure characteristic which is approximately in proportion with the master cylinder pressure and which has a pressure increasing gradient slower than the pressure increasing gradient of the above mentioned brake pressure characteristic is obtained.

When the brake pedal (not shown) is positioned from the above operated condition to the non-operated condition, since the end surface 5f of the step portion is formed approximately at a right angle, the regulated pressure is immediately decreased when the end surface 5f reaches the communicating holes 4f at the backward of the spool 5. Accordingly, the performance for controlling the evacuation of the brake fluid just before the stop of the vehicle is improved and a good brake feeling is obtained.

Figure 3:
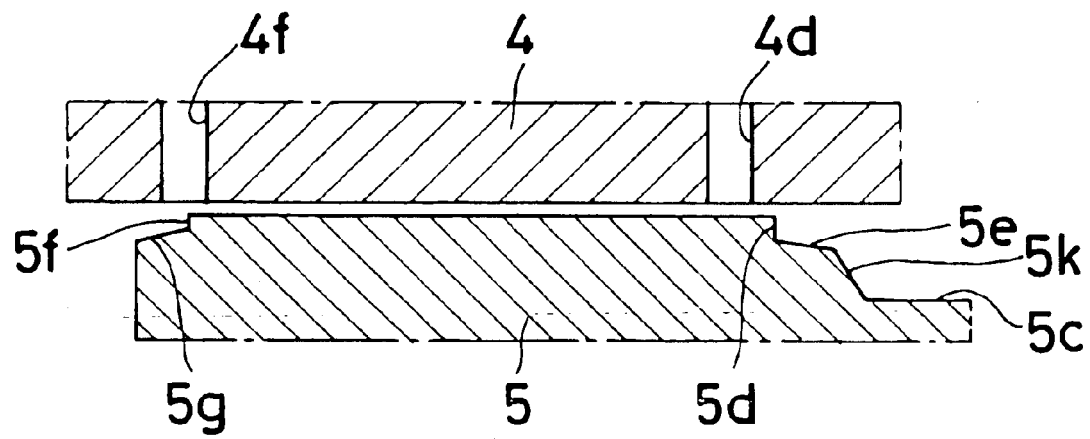
FIG. 3 is a cross-sectional view showing the relationship between the spool and the sleeve of a spool valve according to another embodiment of the present invention.

FIG. 3 shows another embodiment of the present invention. In this embodiment, the inclined surface of the spool 5 is constituted by a plurality of inclined surfaces. Namely, the inclined surface is constituted by the inclined surfaces 5e, 5k. Thereby, since the introduction of the brake fluid into the sleeve 4 is done smoothly, it is possible to further decrease the flow velocity noise while also adequately preventing cavitation from generating. Furthermore, in this embodiment, since two inclined surface are formed consecutively until the groove 5c, the introduction of the brake fluid is smoothly performed.

Figure 4:
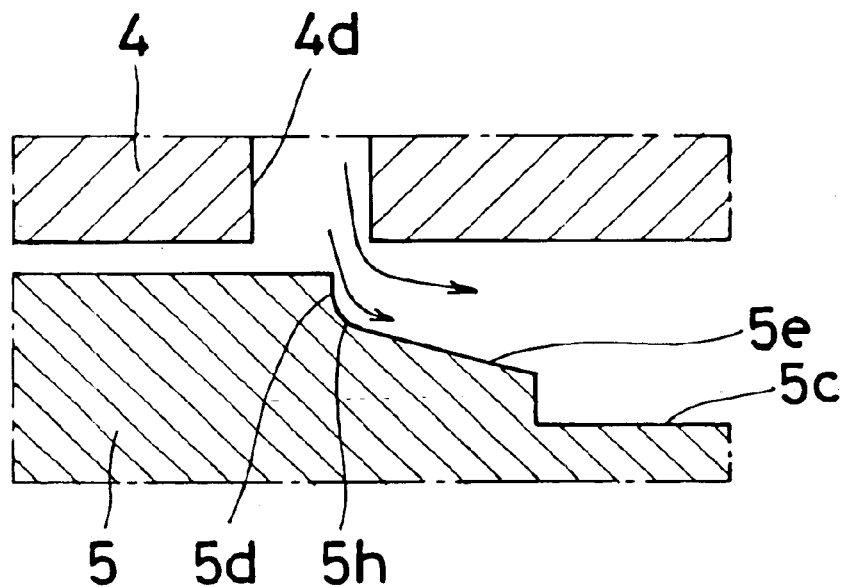
FIG. 4 is a cross-sectional view showing the relationship between the spool and the sleeve of a spool valve of a further embodiment of the present invention.
Figure 5:
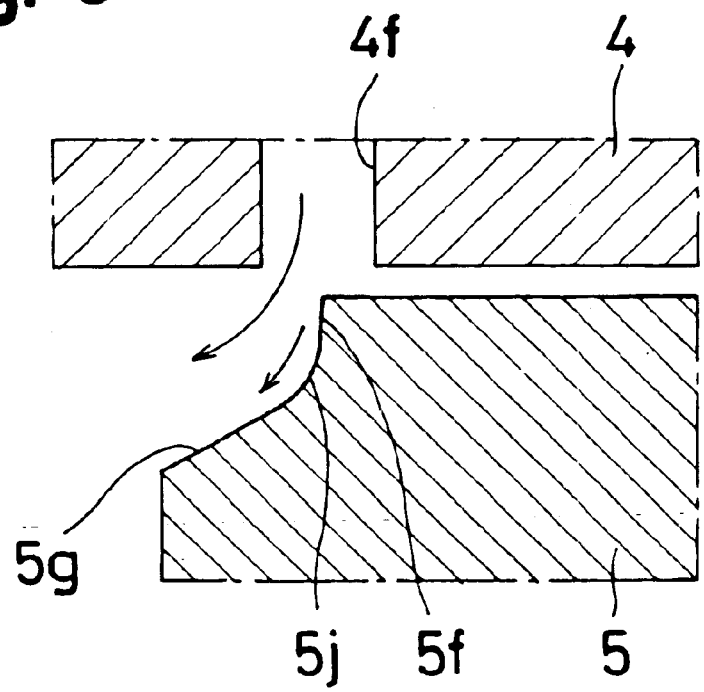
FIG. 5 is a cross-sectional view showing the relationship between the spool and the sleeve of a spool valve of a still further embodiment of the present invention.

FIGS. 4 and 5 show further embodiments of the present invention. In these embodiments, in addition to the above embodiment, boundaries between the end surfaces 5d, 5f and the inclined surfaces 5e, 5g are formed by consecutive curved surfaces 5h, 5j, respectively. Thereby, as shown by the flow of the fluid indicated by the arrow in FIGS. 4 and 5, since the smooth flow is ensured at the introduction of the fluid (brake fluid) into the sleeve 4, it is possible to decrease the hitting sound generated when the fluid hits the inclined surfaces 5e, 5g and it is possible to adequately prevent cavitation from generating. The flow of the brake fluid in FIG. 4 is the case in which the pressure in the regulator chamber C2 is increased and the communicating holes 4f are closed. On the other hand, the flow of the brake fluid in FIG. 5 is the case in which the pressure in the regulator chamber C2 is decreased and the communicating holes 4d are closed. The spool valve according to the present invention can use not only for the hydraulic brake device but also for other fluid apparatus.

Since the present invention is constituted as described above, following effects are obtained. Namely, in the spool valve described above, since a step portion having an end surface which is approximately at right angle to the axis of the spool from an outer circumference and an inclined surface which progressively decreases the diameter of the spool from the end surface toward the outside of the spool is formed on at least one of the one end portion and the other end portion of the spool, it is possible to set the relative location between the spool and the sleeve adequately and easily. Further, it is possible to decrease the flow velocity noise at the introduction of the pressurized fluid and prevent the cavitation from generating adequately.

Further, with the inclined surface constituted by a plurality of inclined surfaces, it is possible to further decrease the flow velocity noise while also adequately preventing cavitation from generating. Also, since a boundary between the end surface and the inclined surface is formed by a consecutive curved surface, it is possible to decrease hitting sound at the introduction of the pressurized fluid while also adequately preventing cavitation from generating.

Further, since the inclined surface is consecutively formed until the groove of the spool, the flow of the fluid becomes smooth and it is possible to adequately prevent cavitation from generating.

What is claimed is:

1. A spool valve comprising:

a sleeve possessing a cylinder bore, a first communicating hole opening into the cylinder bore and a second communicating hole opening into the cylinder bore, the first and second communicating holes being axially spaced apart from each other; and a spool slidably positioned in the cylinder bore in a fluid-tight manner for sliding movement within the cylinder bore, the spool having first and second portions, the spool possessing an outer surface and an axis;

the first portion of the spool being adapted to open and close the first communicating hole upon sliding movement of the spool in the cylinder bore;

the second portion of the spool being adapted to close and open the second communicating hole upon sliding movement of the spool in the cylinder bore;

the first and second portions of the spool being provided with first and second step portions respectively, each of the first and second step portions defined by an end surface extending inwardly from the outer surface of the spool approximately at a right angle to the axis of the spool, inwardly inclined surface located between the end surface and an end of the spool to form a progressively decreasing diameter portion of the spool and a curved surface positioned between the end surface and the inclined surface, the curved surface being consecutive with the end surface and the inclined surface.

2. A spool valve according to claim 1, wherein the outer surface of the spool includes a groove, the inclined surface of the first step portion extending consecutively from the end surface of the first step portion to the groove.

3. A spool valve according to claim 2, wherein the second step portion is located at one end of the spool.

* * * * *